United States Patent [19]
Buchberger et al.

[11] 3,860,839
[45] Jan. 14, 1975

[54] ELECTRODYNAMIC TRAVELLING FIELD LINEAR MOTOR OF THE SYNCHRONOUS TYPE

[75] Inventors: Hubert Buchberger; Reinmar Hussel, both of Berlin, Germany

[73] Assignee: Siemens Aktiengesellschaft, Munich, Germany

[22] Filed: Aug. 7, 1973

[21] Appl. No.: 386,424

[30] Foreign Application Priority Data
Aug. 15, 1972 Germany............................ 2240704

[52] U.S. Cl.......................... 310/12, 310/14, 310/30
[51] Int. Cl. ............................................. H02k 41/02
[58] Field of Search.......................... 310/12, 14, 30

[56] References Cited
UNITED STATES PATENTS

| | | | |
|---|---|---|---|
| 3,456,136 | 7/1969 | Pierro | 310/12 |
| 3,699,365 | 10/1972 | Leitgeb | 310/12 |
| 3,706,922 | 12/1972 | Inagaki | 310/12 X |

*Primary Examiner*—Gerald Goldberg
*Attorney, Agent, or Firm*—Kenyon & Kenyon Reilly Carr & Chapin

[57] ABSTRACT

An electrodynamic travelling field linear motor of synchronous construction has a primary and a secondary arranged with respect to each other for generating a relative thrust movement therebetween in at least one of two mutually opposite directions. An ancillary direct-current flux yoke is provided at least at the leading end-face of the lamination stack of the primary inductor. The eddy currents which delay the buildup of the field are reduced in this yoke so that the fringe effect caused by these eddy currents does not occur in the region of the multi-phase alternating current winding mounted in the lamination stack.

8 Claims, 2 Drawing Figures

ELECTRODYNAMIC TRAVELLING FIELD LINEAR MOTOR OF THE SYNCHRONOUS TYPE

BACKGROUND OF THE INVENTION

As disclosed for example in Deutsche Offenlegungsschrift 1,941,613, an electric travelling-field motor, also called a linear motor, of synchronous construction consists of an inductor (primary part) on which the multiphase alternating-current winding is arranged in a stack of laminations for generating the travelling field. In addition to this multi-phase winding there is arranged on the inductor a separate direct-current excitation winding for exciting the machine field. Associated therewith is a secondary system which includes alternatingly solid magnetic and non-magnetic sections. The distance between centers of the magnetic sections is twice the pole pitch of the multi-phase alternating-current winding of the inductor.

There are several possible types of configuration for synchronous linear motors; for instance, the inductor can be arranged on one or both sides of the secondary system. The stack of laminations carrying the multiphase alternating-current winding can also be subdivided in its height, as described, for example, in the Deutsche Auslegeschrift 2,040,986; in that case, however, a corresponding subdivision of the secondary system of the multi-phase alternating-current winding must also be made.

Common to all linear motors of synchronous construction is the phenomenon designated as fringe effect, that is, when the solid magnetic section of the secondary part (reaction tooth) enters the field of the machine, particularly the direct-current field produced by the direct-current excitation winding, eddy currents are generated because of the rise of the field. These eddy currents attenuate the travelling field whereby the thrust of the linear motor is reduced.

SUMMARY OF THE INVENTION

It is an object of the invention to improve the capacity of an electric travelling-field linear motor of the synchronous type.

The invention relates to an electrodynamic travelling-field linear motor of the synchronous type in which the field of the machine is excited by a separate direct-current excitation winding which is arranged on the inductor in addition to the multi-phase winding which is arranged in a stack of laminations of the inductor and generates the travelling field. The motor has a secondary system comprising alternatingly solid magnetic and non-magnetic sections, where the distance between centers of the magnetic sections is twice the pole pitch of the multi-phase alternating winding of the inductor. According to a feature of the invention, an additional direct-current excited yoke is arranged at the end-face of the stack of laminations, at least at that end-face thereof which is situated in front in the direction of the thrust. In this manner the solid magnetic section of the secondary part (reaction tooth) first enters the pure direct-current field of the additional yoke.

An electrodynamic travelling field motor of the invention is of the synchronous type and is a linear motor which includes as a feature a primary and secondary arranged with respect to each other for generating a relative thrust movement therebetween in at least one of two mutually opposite directions. An inductor assembly of the primary and includes a lamination stack of metal laminations adjacent the secondary. The lamination stack has respective end-faces directed in corresponding ones of the directions. One of the end-faces is a leading end-face in the direction of the thrust. A yoke is mounted on at least this leading end-face. Direct-current excitation means is arranged on the inductor assembly for generating the machine field of the motor and for exciting the yoke. A multi-phase alternating-current winding having a determined pole pitch is mounted in the lamination stack for generating a travelling field. The secondary includes solid magnetic sections arranged in a row one behind the other so as to define between each two mutually adjacent ones of these sections a space constituting a non-magnetic section whereby the secondary is made up of alternately magnetic and non-magnetic sections. The solid magnetic sections are at a center-to-center spacing corresponding to twice the pole pitch of the alternating-current winding.

As indicated above, the solid magnetic section of the secondary part first enters the pure direct-current field of the yoke at the leading end-face of the lamination stack. Through the build-up of the field from zero to its maximum value, eddy currents are generated in this process in the entering solid magnetic section, which delay the build-up of the field. The length of the additional yoke in the direction of travel of the linear motor is chosen so that it is sufficient to breakdown the eddy currents. Although the occurring losses are not diminished thereby, the travelling field passing through the multi-phase alternating-current winding is no longer reduced by the fringe effect, so that larger thrust forces and thereby better efficiency are obtained.

The required minimum length of the additional yoke in the direction of travel can be calculated from the dimensions of the solid magnetic reaction tooth by known formulas for the time constant in building up a magnetic field with consideration of the entering velocity of the solid magnetic reaction tooth. The additional yoke can either be attached as a solid part laterally at the end-faces of the stack of laminations with the multi-phase alternating-current winding, or can also be punched to form part of the laminations. Depending on whether a synchronous linear motor is involved which is operated in one or in both directions of travel, the additional direct-current excited yoke will be provided on only one or both endfaces of the stack of laminations.

For generating the direct-current flux in the additional yoke, the direct-current excitation coil of the linear motor itself will generally be used, but it is also possible to provide a separate direct-current excitation winding for each yoke. In order to avoid any influence of the travelling field on the direct-current flux in the additional yoke, an air gap can be provided between the additional yoke and the stack of laminations with the multi-phase alternating-current winding.

Although the invention is illustrated and described herein as a synchronous linear motor, it is nevertheless not intended to be limited to the details shown, since various modifications may be made therein within the scope and the range of the claims. The invention, however, together with additional objects and advantages will be best understood from the following description and in connection with the accompanying drawing.

DESCRIPTION OF THE PREFERRED EMBODIMENTS OF THE INVENTION

Figure 1:
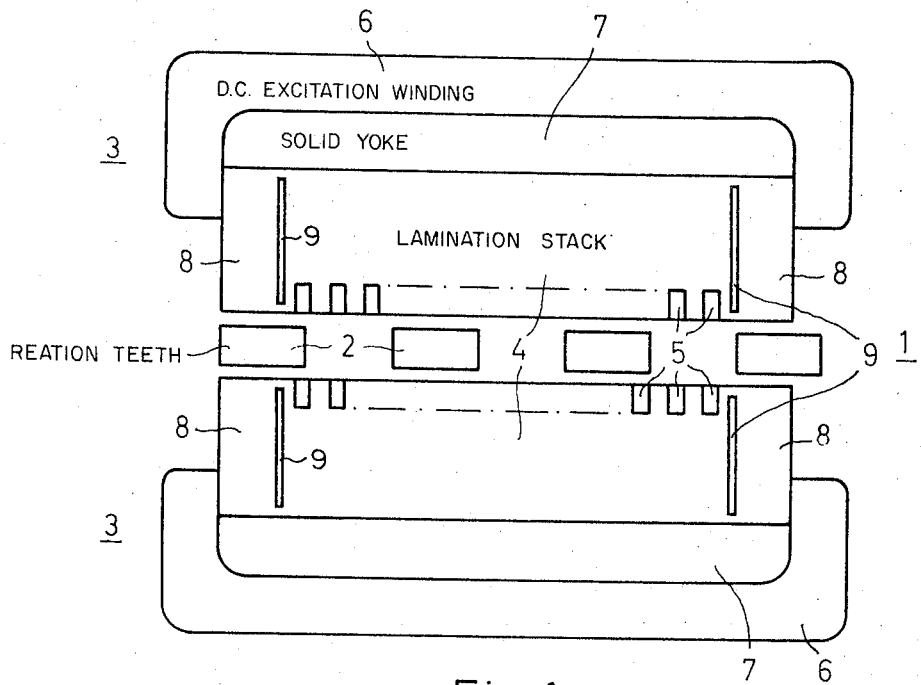
FIG. 1 is a schematic diagram of a synchronous linear motor according to the invention.

FIG. 1 shows a longitudinal cross-section of a double-sided electric linear motor 1 of the synchronous type according to the invention. The secondary system consists of a succession of solid magnetic reaction teeth 2. These teeth 2 are spaced one from the other by the same distance thereby forming the non-magnetic sections of the secondary system.

On each side of the secondary system is arranged an inductor 3 comprising the stack of laminations 4 in the slots 5 of which the multi-phase alternating-current winding (not shown) is accommodated. The inductor 3 also carriers direct-current excitation means comprising the direct-current excitation winding 6 which further surrounds a solid yoke 7 located at the back of the stack of laminations 4. On each end-face of the stack of laminations 4 is further arranged an additional yoke 8 which is punched to form part of the laminations of the stack of laminations 4 in such a manner that an air gap 9 is defined. The additional yoke 8 is also excited by the direct-current excitation winding 6. A pure direct-current field is therefore produced in the yoke 8 which is separated by the air gap 9 from the machine field proper, the machine field being composed of the direct-current field and the travelling field.

The arrangement functions as follows: When a solid magnetic reaction tooth 2 enters the region covered by the inductors 3, it first enters the pure direct-current field of the yoke 8. Because the field in the solid reaction tooth 2 must build up gradually, eddy currents are generated therein which act to delay the build-up of the field. The length of the yokes 8 in the direction of travel is now chosen as a function of the dimensions of the reaction tooth (the distance from tooth center to tooth center is twice the pole pitch of the multi-phase alternating-current winding, and the length of the tooth in the direction of motion is smaller than or equal to the pole pitch) and the entering velocity in such a manner that this delaying influence of the generated eddy currents is broken down. Accordingly, when the magnetic tooth, now having a direct-current field, enters the region of the machine field proper, the desired maximum thrust is reached without the interfering fringe effect which was removed from the region of the machine field proper by the yokes 8. The efficiency of the linear motor is thereby improved, but the losses caused by the fringe effect remained the same.

Figure 2:
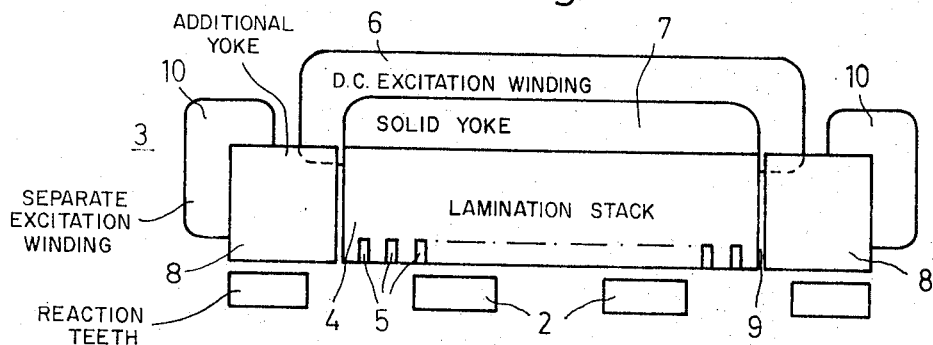
FIG. 2 illustrates an alternate embodiment of the synchronous linear motor according to the invention wherein an inductor is provided on only one side of the secondary.

FIG. 2 shows another embodiment of a synchronous linear motor configured in accordance with the invention. This is a one-sided synchronous linear motor 1 in which only one inductor 3 is present on one side of the secondary system. The additional yokes 8 are made solid in this embodiment and are disposed on each end-face of the stack of laminations 4. The lamination stack 4 is provided with the slots 5 for the multi-phase alternating-current winding (not shown) and the air gap 9 is left between the laminated stack 4 and the yokes 8.

The solid yokes 8 have a separate excitation winding 10 through which the direct-current flows and which is laid out so that the fringe effect is already exhausted in the solid reaction tooth 2 when it enters the lamination stack 4. The direct-current excitation winding 6 is configured for exciting the machine field alone. Otherwise, the operation of the arrangement upon the entry of the solid reaction teeth 2 into the region of the inductor 3 is the same as for the embodiment of FIG. 1.

What is claimed is:

1. An electrodynamic travelling field linear motor of synchronous construction comprising: a primary and a secondary arranged with respect to each other for generating a relative thrust movement therebetween in at least one of two mutually opposite directions; said primary comprising an inductor assembly including a lamination stack of metal laminations adjacent said secondary, said lamination stack having respective end-faces directed in corresponding ones of said directions, one of said end-faces being a leading end-face in the one direction of said thrust movement, and a yoke mounted at said leading endface; direct-current excitation means arranged on said inductor assembly for generating the machine field of the motor and for exciting said yoke; and, a multi-phase alternating-current winding mounted in said lamination stack for generating a travelling field, said alternating-current winding having a determined pole-pitch; and, said secondary including solid magnetic sections arranged in a row one behind the other so as to define between each two mutually adjacent ones of said sections a space constituting a non-magnetic section whereby said secondary is made up of alternately magnetic and nonmagnetic sections, said solid magnetic sections being at a center-to-center spacing corresponding to twice the pole pitch of said alternating-current winding.

2. The travelling field motor of claim 1 wherein said primary and said secondary are arranged with respect to each other for generating a relative thrust movement in either one of two mutually opposite directions, said inductor assembly including an additional yoke mounted at the other one of said end-faces of said lamination stack, said direct-current excitation means including means for exciting said additional yoke.

3. The travelling field motor of claim 1, said direct-current excitation means comprising a main yoke located at the back of said lamination stack away from said secondary and a direct-current excitation winding for exciting said main yoke for generating said machine field and for exciting said first-mentioned yoke.

4. The travelling field motor of claim 1, said yoke being made of solid metal.

5. The travelling field motor of claim 4, said yoke being joined to said lamination stack so as to define an air gap between said yoke and said lamination stack.

6. The travelling field motor of claim 1, said yoke being made of metal laminations stacked to said metal laminations of said lamination stack.

7. The travelling field motor of claim 6, said yoke being stacked to said lamination stack so as to define an air gap between said yoke and said lamination stack.

8. The travelling field motor of claim 1, said direct-current excitation means comprising a direct-current winding for generating said machine field, and another direct-current winding corresponding to said yoke for exciting the same.

* * * * *